US012729728B2

(12) United States Patent
Zenzen et al.

(10) Patent No.: US 12,729,728 B2
(45) Date of Patent: Sep. 8, 2026

(54) BRAKE LINING ARRANGEMENT FOR A VEHICLE DISC BRAKE

(71) Applicant: ZF Active Safety GmbH, Koblenz (DE)

(72) Inventors: Guido Zenzen, Macken (DE); Marco Becker, Oberduerenbach (DE); Peter Maeurer, Koblenz (DE); Lukas Madzgalla, Lahnstein (DE); Jörg Knieper, Vallendar (DE); Florian Roessinger, Neuwied (DE); Philipp Schwenzer, Urmitz (DE); Paul Wecker, Limburg (DE)

(73) Assignee: ZF Active Safety GmbH, Koblenz (DE)

( * ) Notice: Subject to any disclaimer, the term of this patent is extended or adjusted under 35 U.S.C. 154(b) by 403 days.

(21) Appl. No.: 17/839,715

(22) Filed: Jun. 14, 2022

(65) Prior Publication Data

US 2022/0397173 A1 Dec. 15, 2022

(30) Foreign Application Priority Data

Jun. 15, 2021 (DE) ........................ 102021206055.2

(51) Int. Cl.
*F16D 65/097* (2006.01)
*F16D 55/228* (2006.01)
(Continued)

(52) U.S. Cl.
CPC ....... *F16D 65/0979* (2013.01); *F16D 55/228* (2013.01); *F16D 65/52* (2013.01); *F16D 2127/02* (2013.01)

(58) Field of Classification Search
CPC ................................................ F16D 2055/0029
See application file for complete search history.

(56) References Cited

U.S. PATENT DOCUMENTS 3,494,448 A * 2/1970 Ruprecht .............. F16D 55/226 188/72.1
4,881,623 A * 11/1989 Kondo .................. F16D 55/227 188/73.38
6,197,095 B1 * 3/2001 Ditria ................. B01D 19/0068 96/182

FOREIGN PATENT DOCUMENTS

DE 102016117777 A1 * 3/2018 ........... F16D 55/226
DE 102018116868 A1 * 1/2020
(Continued)

OTHER PUBLICATIONS

WO-2019025219 machine translation (Year: 2019).*
(Continued)

*Primary Examiner* — Melanie Torres Williams
(74) *Attorney, Agent, or Firm* — Kristin L. Murphy

(57) ABSTRACT

The present disclosure relates to a brake lining arrangement for a vehicle disc brake, comprising at least one brake lining carrier plate, at least one friction lining, and at least one restoring element. The friction lining is attached to the front surface of the at least one brake lining carrier plate. The at least one restoring element is fastened to the rear surface of the at least one brake lining carrier plate and may be coupled to a brake caliper of the vehicle disc brake. At least one restoring element has at least two spring portions. The at least one restoring element is configured such that the at least two spring portions of the at least one restoring element act on the brake caliper under pretensioning.

13 Claims, 8 Drawing Sheets

(51) Int. Cl.
*F16D 65/52* (2006.01)
*F16D 127/02* (2012.01)

(56) References Cited

FOREIGN PATENT DOCUMENTS

| | | | | | |
|---|---|---|---|---|---|
| DE | 102019000444 | A1 | | 7/2020 | |
| DE | 102020205227 | A1 | | 10/2021 | |
| WO | 2017130628 | A1 | | 8/2017 | |
| WO | WO-2019025219 | A1 | * | 2/2019 | ........... F16D 55/228 |
| WO | 2019243933 | A1 | | 12/2019 | |
| WO | 2019243934 | A1 | | 12/2019 | |
| WO | WO-2020038911 | A1 | * | 2/2020 | ........... F16D 65/092 |

OTHER PUBLICATIONS

DE-102018116868 machine translation (Year: 2020).*
DE-102016117777 machine translation (Year: 2018).*
WO-2020038911-A1: English Machine Translation (Year: 2020).*

* cited by examiner 1000
100
318
108
D
326
330
306
120
204
208
104
206
210
332
118
302
328
126
304
B
364
324
362
128
300
366
200
102
106
202
D

BRAKE LINING ARRANGEMENT FOR A VEHICLE DISC BRAKE

CROSS-REFERENCE TO RELATED APPLICATION

This application claims priority to German Priority Application No. 102021206055.2, filed Jun. 15, 2021, the disclosure of which is incorporated herein by reference in its entirety.

TECHNICAL FIELD

The present disclosure relates to a brake lining arrangement for a vehicle disc brake. The present disclosure further relates to a vehicle disc brake comprising at least one such brake lining arrangement.

SUMMARY

What is needed is a brake lining arrangement which may be displaced back into an initial position in a safe and reliable manner after a braking process.

A brake lining arrangement is disclosed.

In one exemplary arrangement, a brake lining arrangement according to the disclosure for a vehicle disc brake comprises at least one brake lining carrier plate, at least one friction lining which is attached to the front surface of the at least one brake lining carrier plate and at least one restoring element which is fastened to the rear surface of the at least one brake lining carrier plate and which may be coupled to a brake caliper of the vehicle disc brake. The at least one restoring element has at least two spring portions. In one exemplary arrangement, the at least one restoring element is configured such that the at least two spring portions of the at least one restoring element act on the brake caliper under pretensioning.

The at least one restoring element provides for the possibility to ensure that after a braking process the brake lining arrangement is able to be transferred back again into its defined initial position and a sufficiently large spacing may be produced from a brake disc. In other words, the at least one restoring element ensures a reliable separation of the friction linings from the brake disc in order to prevent an abrasion of the friction linings on the brake disc when the brake is released. Moreover, the wear on the friction linings may be compensated by the at least one restoring element. The at last one restoring element permits a re-adjustment of the initial position of the brake lining arrangement as a function of the wear on the friction lining. Thus the spacing between the friction lining and the brake disc may also be kept substantially constant by the brake lining arrangement according to the disclosure, even in the case of wear on the at least one friction lining.

The at least one restoring element may have at least one fastening portion, the at least one restoring element being able to be fastened thereby to a rear surface of the at least one brake lining carrier plate. The at least one fastening portion may extend between the at least two spring portions. Thus the at least one fastening portion may be provided in a central region of the at least one restoring element.

The at least one restoring element may have at least one support portion for support on the brake caliper. The at least one support portion may be arranged between the at least one fastening portion and one of the at least two spring portions. The at least one restoring element may have at least two support portions. The at least one fastening portion may be arranged between the at least two support portions. The at least two support portions and the at least one fastening portion may be arranged between the at least two spring portions. The at least one support portion may set a predetermined spacing between the brake lining carrier plate and the brake caliper. This spacing may be set, in particular, in the direction of the actuating axis of a vehicle disc brake. The at least one support portion may extend between the rear surface of the brake lining carrier plate and the brake caliper. The at least one support portion may have a bend and/or a kink. The at least one support portion may be supported on the brake caliper by the apex of the bend or the kink.

The at least one restoring element may have at least one bearing portion for bearing against the rear surface of the at least one brake lining carrier plate. The at least one bearing portion may be provided between one of the spring portions and the at least one fastening portion. The at least one bearing portion may extend between one of the spring portions and the at least one support portion. The at least one support portion may come into contact with the rear surface of the brake lining carrier plate.

The at least one restoring element may have at least one stop portion which has a predetermined spacing from the front surface of the brake lining carrier plate. The at least one restoring element may encompass the brake lining carrier plate such that the at least one stop portion may extend along the front surface of the brake lining carrier plate. The at least one stop portion may be connected to one of the spring portions. The at least one stop portion may extend at least in some portions parallel to the at least one bearing portion. The at least one stop portion may extend at least in some portions parallel to the front surface of the brake lining carrier plate. The at least one stop portion may extend to the side, adjacent to, below or above the friction lining on the brake lining carrier plate. The at least one stop portion may form an end portion of the at least one restoring element. Starting from the upper face or the lower face of the brake lining carrier plate, the at least one stop portion may extend into the region of the front surface of the brake lining carrier plate. If the actuating path of the brake lining arrangement becomes too great due to the wear on the friction lining, the brake lining carrier plate comes into contact with the at least one stop portion. As a result, the brake lining carrier plate may come into contact with the restoring element on the stop portion, and entrain and move said restoring element relative to the brake caliper. In this manner, the wear on the friction lining may be compensated since the initial position of the brake lining arrangement has been reset by the changed position of the restoring element on the brake caliper as a function of the wear on the friction lining.

In one exemplary arrangement, the at least one brake lining carrier plate may have at least one recess in which the at least one stop portion extends. Starting from the upper face or the lower face of the brake lining carrier plate, the at least one recess may extend into the brake lining carrier plate.

The at least one brake lining carrier plate may have at least one fastening recess. The fastening recess may be configured on the rear surface of the brake lining carrier plate. The at least one fastening portion may be received at least in some portions in the at least one fastening recess. The fastening portion may be brought into contact with the brake lining carrier plate by a plastic deformation of the brake lining carrier plate and/or the fastening portion. In one exemplary arrangement, the at least one fastening portion may be attached to the brake lining carrier plate by material deformation. For example, the fastening portion may be fastened to the brake lining carrier plate by a caulking process.

The brake lining arrangement may have at least one plate-shaped element which is attached to the brake lining carrier plate. The at least one plate-shaped element may prevent vibrations from being transmitted from the brake lining carrier plate to the brake caliper. As a result, it is possible to reduce undesired noise developments which may arise due to the vibrations.

The at least one fastening portion of the at least one restoring element may be attached to the plate-shaped element. Additionally or alternatively, the at least one fastening portion of the at least one restoring element may be held on the brake lining carrier plate by the plate-shaped element. The at least one plate-shaped element may have at least one extension, the at least one fastening portion being able to be attached thereto.

The at least two spring portions may be configured to be hook-shaped. The at least two spring portions may have in each case a contact portion. The at least one contact portion may serve to hold the at least one restoring element on the brake caliper. The at least one contact portion may be configured to come into contact with the brake caliper. The at least one contact portion may have a bend. At least one of the at least two spring portions may transition via a bent portion into the at least one stop portion. The at least one spring portion may extend between the at least one stop portion and the at least one support portion. The spring portions may be configured to be V-shaped or U-shaped.

The present disclosure further relates to a vehicle disc brake comprising a brake lining arrangement of the type described above and a brake caliper, the at least one brake lining arrangement being coupled thereto.

The at least one brake caliper may have at least one recess in which at least one of the spring portions of the at least one restoring element engages. The at least one recess may have at least one inclined base. The depth of the recesses may be increased in a direction away from the brake lining arrangement. The at least one recess may be of groove-shaped configuration. The at least one contact portion of the at least one restoring element may come into contact with the base of the at least one recess on the brake caliper. Due to the inclined base of the recess, it is possible to assist the maintenance of a predetermined restoring force by the at least one restoring element.

The at least one brake caliper may have at least one receiving channel. The at least one recess may be configured, relative to a brake disc, on a radially external surface or on a radially internal surface of the brake caliper. The at least one receiving channel may be spanned by at least one web. The at least one web may extend on an upper face or on an radially external end of the at least one receiving channel. The at least one receiving channel may have two walls, the brake lining arrangements being arranged thereon. The two walls may oppose one another and extend parallel to one another. The at least one restoring element may extend in some portions between one of these walls of the receiving channel and the rear surface of the brake lining carrier plate.

BRIEF DESCRIPTION OF DRAWINGS

An exemplary arrangement of the present disclosure is described hereinafter with reference to the accompanying figures, in which.

DETAILED DESCRIPTION

Figure 1:
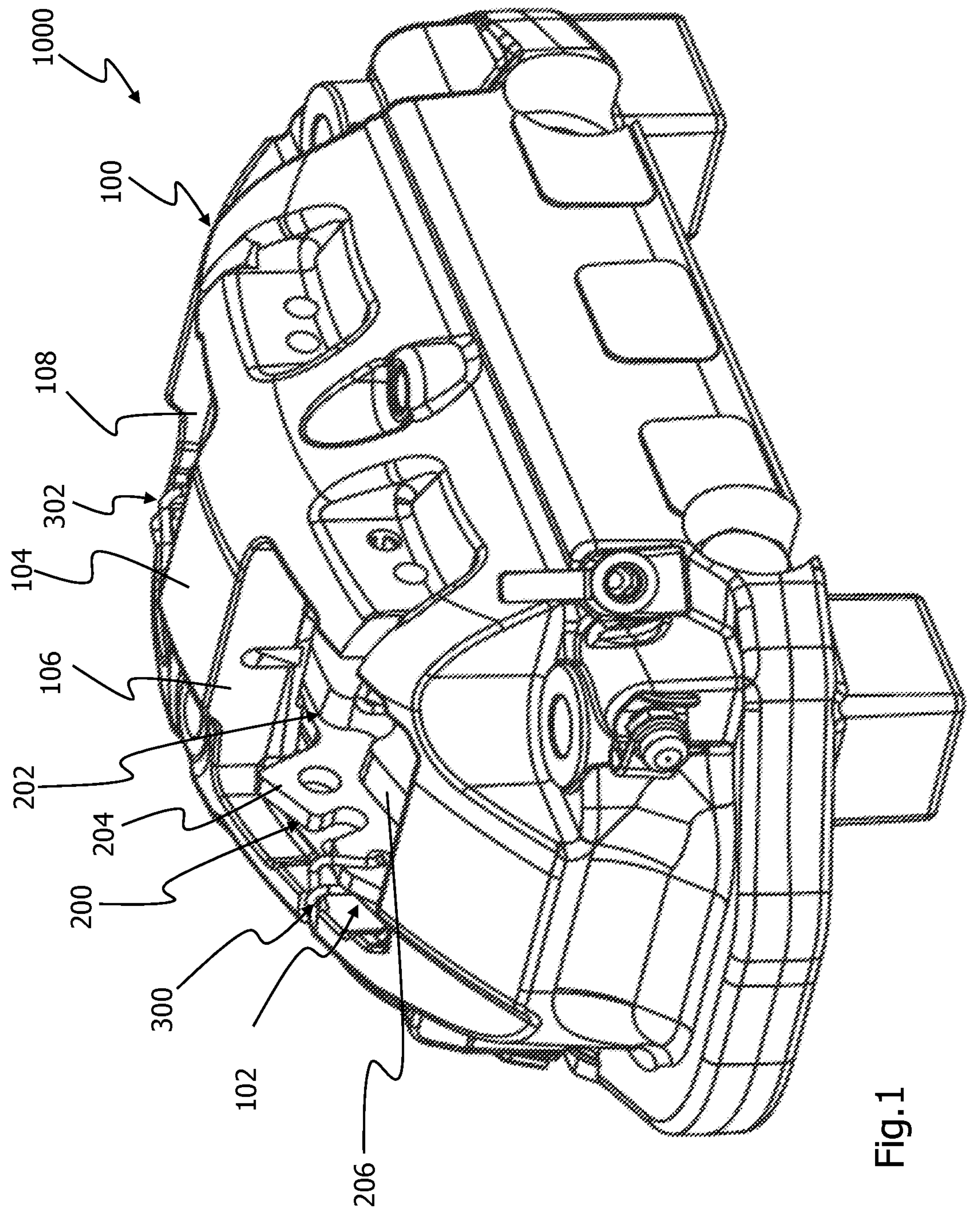
FIG. 1 shows a perspective view of a vehicle disc brake.

FIG. 1 shows a perspective view of a vehicle disc brake 1000. In the exemplary arrangement shown, the vehicle brake 1000 is a fixed caliper disc brake. The vehicle disc brake 1000 has a brake caliper 100 and brake lining arrangements 200, 202. The brake caliper 100 has a receiving channel 102 in which the brake lining arrangements 200, 202 are arranged. A web 104 spans the receiving channel 102 such that two openings 106 and 108 are formed on an upper face of the brake caliper 102.

The brake lining arrangements 200, 202 are coupled to the brake caliper 100 via restoring elements. In FIG. 1 only the restoring elements 300, 302 which couple the brake lining arrangement 200 to the brake caliper 100 may be identified. The brake lining arrangements 202 are also coupled to the brake caliper 100 via two restoring elements, not shown in FIG. 1. The brake lining arrangements 200, 202 in each case have a brake lining carrier plate 204, 206. The restoring elements 300, 302 are coupled to the brake lining carrier plate 204, 206 and act on the brake caliper 100 under pretensioning.

Figure 2:
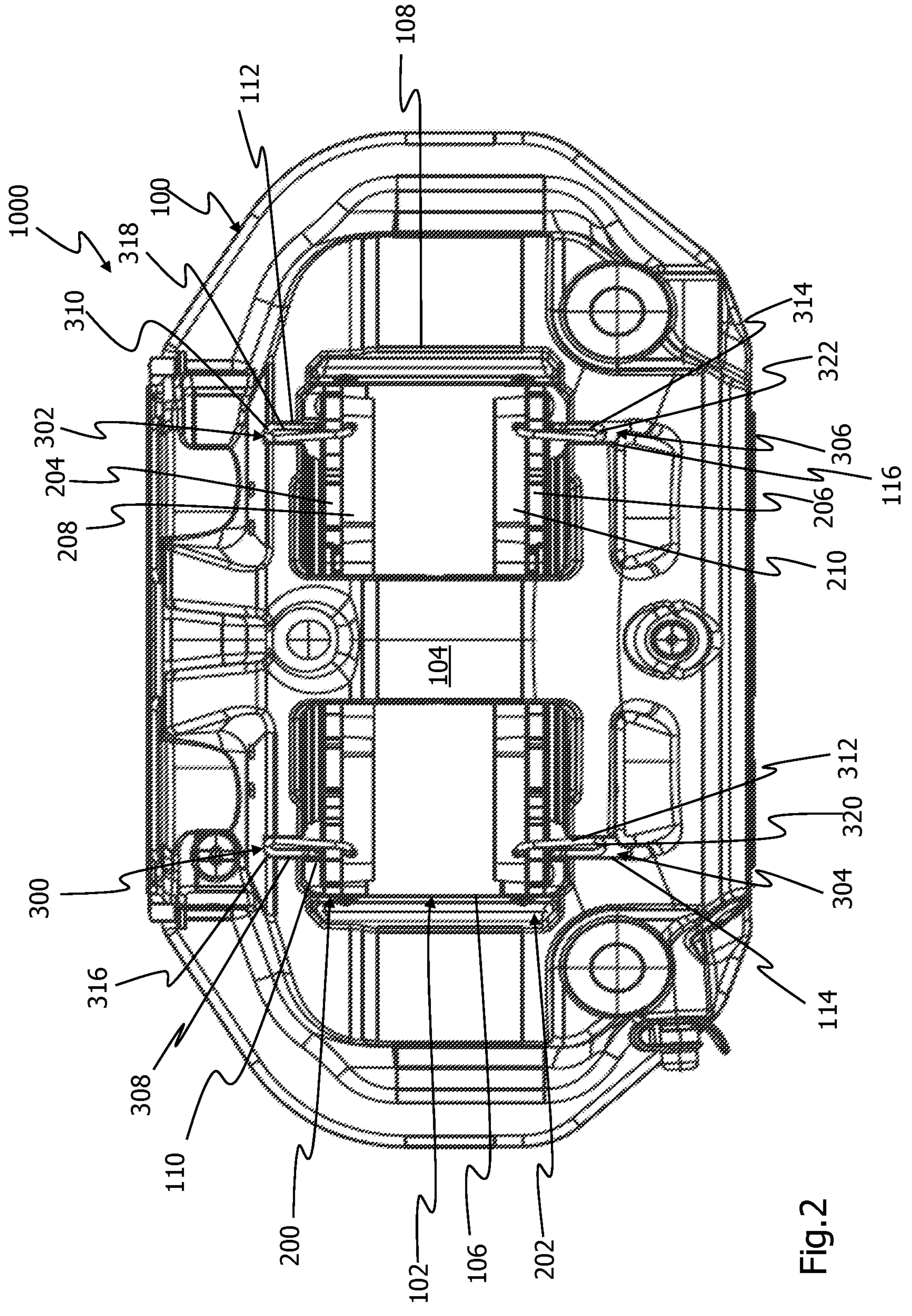
FIG. 2 shows a plan view of the vehicle disc brake according to FIG. 1.

FIG. 2 shows a plan view of the vehicle disc brake 1000. The brake caliper 100 has the receiving channel 102 which is spanned by a web 104. The brake lining arrangements 200, 202 are received in the receiving channel 102. The brake lining arrangements 200, 202 in each case have a brake lining carrier plate 204, 206 and a friction lining 208, 210 attached thereto. In a mounted state of the vehicle disc brake 1000 on a vehicle, a brake disc, not shown in FIG. 1, is arranged between the brake lining arrangements 200, 202, the brake lining arrangements 200, 202 being able to be brought into contact therewith in order to bring about braking.

The brake lining arrangements 200, 202 are coupled via restoring elements 300, 302, 304 and 306 to the brake caliper 100. The restoring elements 300, 302 are assigned to the brake lining arrangement 200. The restoring elements 304, 306 are assigned to the brake lining arrangement 202. The restoring elements 300, 302, 304 and 306 hold the brake lining arrangements 200, 202 in a predetermined position on the brake caliper 100. To this end, the restoring elements 300, 302, 304 and 306 act on the brake caliper 100 under pretensioning. The brake lining arrangements 200, 202 are pretensioned by the restoring elements 300, 302, 304, 306 into a predetermined position. Due to this resilient coupling of the brake lining arrangements 200, 202 to the brake caliper 100 via the restoring elements 300, 302, 304, 306, the brake lining arrangements 200, 202 may not only be held securely in their predetermined position but vibrations may also be effectively damped in the case of contact between the brake disc, not shown, and the friction linings 204 and 206 in order to bring about braking.

In FIG. 2 one of the spring portions 308, 310, 312, 314 of the restoring elements 300, 302, 304 and 306 is shown in each case. The spring portions 308, 310, 312 and 314 are of tubular configuration. The spring portions 308, 310, 312 and 314 have a contact portion 316, 318, 320, 322 which is configured to be bent. The contact portion 316, 318, 320, 322 is in contact with the brake caliper 100. The brake caliper 100 has recesses 110, 112, 114 and 116 on the upper face thereof. In each case one of the spring portions 308, 310, 312, 314 extends at least in some portions in these recesses 110, 112, 114, 116. The spring portions 308, 310, 312 and 314 come into contact with the brake caliper 100 by their contact portion 316, 318, 320, 322 in the recesses 110, 112, 114, 116.

Figure 3:
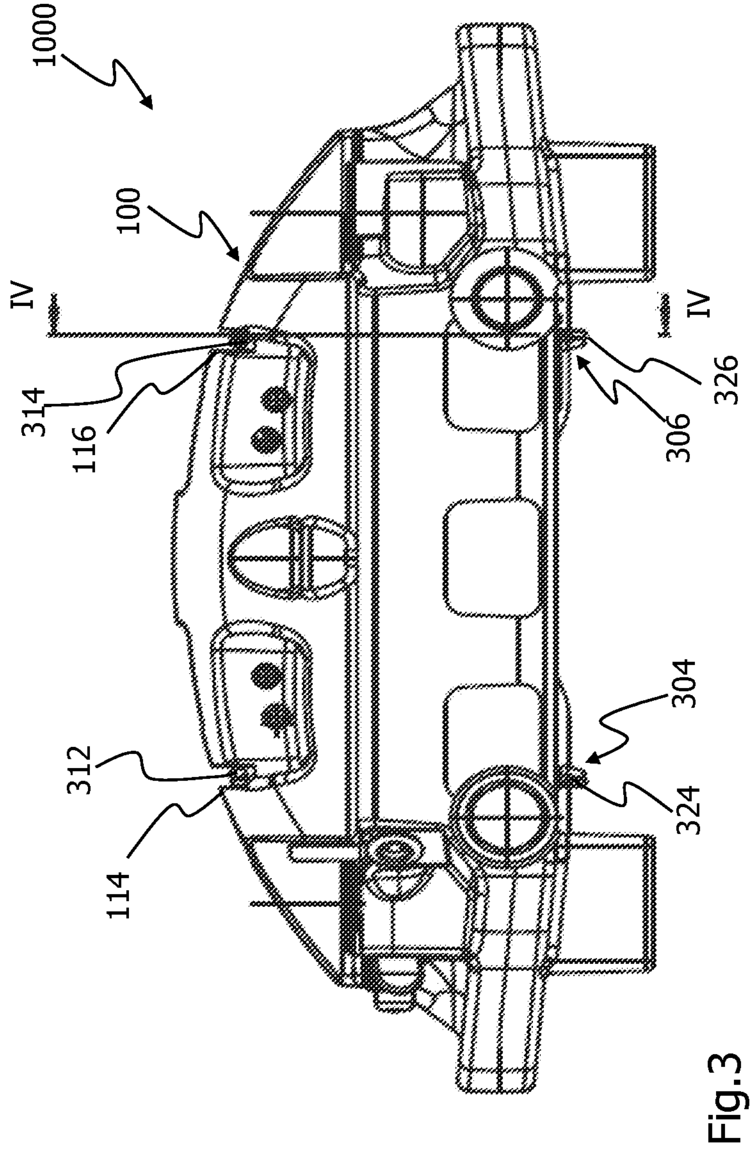
FIG. 3 shows a further view of the vehicle disc brake according to FIGS. 1 and 2.

FIG. 3 shows a side view of the vehicle disc brake 1000, in which the brake caliper 100 may be identified. The recesses 114, 116 are configured on the upper face of the brake caliper 100. The spring portions 312, 314 of the restoring elements 304, 306 extend in the recesses 114, 116. The restoring elements 304, 306 have a further spring portion 324, 326 which may be identified on the lower face of the brake caliper 100 in FIG. 3.

Figure 4:
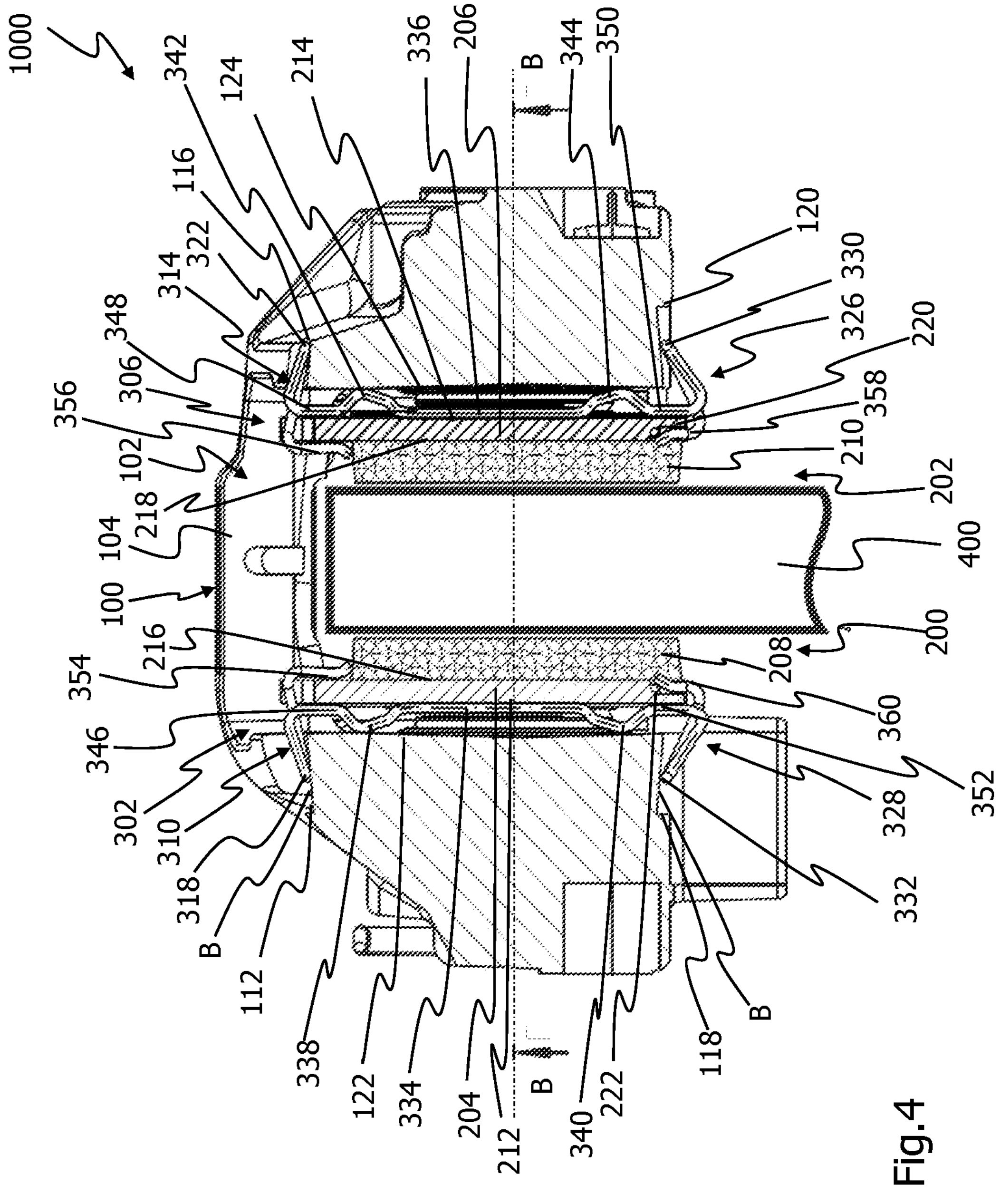
FIG. 4 shows a sectional view along the cutting line IV-IV in FIG. 3.

FIG. 4 shows a sectional view along the cutting line IV-IV in FIG. 3. A brake disc 400 may be identified in the receiving channel 102 of the brake caliper 100 between the friction linings 208, 210 of the brake lining arrangements 204, 206. The friction linings 208, 210 are brought into contact with the brake disc 400 in order to bring about braking during a braking process.

The restoring elements 302, 306 couple the brake lining arrangements 200, 202 to the brake caliper 100. The restoring elements 300, 306 have in each case two spring portions 310, 314, 326 and 328. The spring portions 310, 314, 326, 328 act with their respective contact portion 318, 322, 330, 332 on the brake caliper. The contact portions 318, 322 come into contact with the brake caliper 100 on the upper face thereof. The contact portions 330, 332 come into contact with the brake caliper 100 on the lower face thereof. The recesses 112, 116, 118 and 120 are configured on the brake caliper 100, wherein the recesses 112 and 116 are located on the upper face of the brake caliper 100 and the recesses 118 and 120 are located on the lower face thereof. With reference to the brake disc 400, an upper face of the brake caliper 100 may also be denoted as the radially external side or surface, and the lower face may be denoted as the radially internal side or surface of the brake caliper 100.

The contact portions 318, 322, 330, 332 are in contact with a base B of the recesses 112, 116, 118, 120. The contact portions 318, 322, 330, 332 have a bend by which they are in contact with the base B of the recesses 112, 116, 118, 120. Starting from walls 122, 124 of the receiving channel 102, the recesses 112, 116, 118, 120 extend away from the receiving channel 102. The base B of the recesses 112, 116, 118, 120 may extend in an oblique or inclined manner. Accordingly, the base B of the recesses 112, 116, 118, 120 extends obliquely away from the walls 122, 124 of the receiving channel 102. The depth of the recesses 112, 116, 118, 120 may be increased in a direction away from the walls 122, 124 in order to form the inclined base B.

In FIG. 4, it is clear that the spring portions 310, 314, 326, 328 are configured in hook-shaped manner. The brake lining arrangements 200, 202 may be pretensioned into a predetermined position on the brake caliper 100 by the hook-shaped spring portions 310, 314, 326, 328. Due to this pretensioning the brake lining arrangements 200, 202 may be attached resiliently to the brake caliper 100 in the radial direction of the brake disc 400, whereby vibrations occurring during a braking process may be damped.

The restoring elements 302, 306 have a fastening portion 334 and 336, the restoring elements 302, 306 being fastened thereby to the rear surface 212, 214 of the brake lining arrangements 200 and 202. The restoring elements 302, 306 also have two support portions 338, 340, 342, 344 in each case. The support portions 338, 340, 342, 344 adjoin the fastening portion 334, 336 of the respective restoring element 302, 306. In other words, the fastening portion 334, 336 of a restoring element 302, 306 is arranged between two support portions 338, 340 or 342, 344. The restoring elements 302, 306 are supported on the walls 122, 124 of the receiving channel 102 by the support portions 338, 340, 342, 344. The walls 122, 124 oppose one another and extend parallel to one another. The support portions 338, 340, 342, 344 may set a predetermined spacing between the brake lining carrier plate 204, 206 and the respective wall 122, 124 of the brake caliper 100. The support portions 338, 340, 342, 344 have a bend in order to be able to set the spacing between the brake lining carrier plate 204, 206 and one of the walls 122, 124.

The restoring elements 302 and 306 also have bearing portions 346, 348, 350, 352, said restoring elements bearing thereby at least in some portions against the rear surface 212, 214 of the brake lining carrier plate 204 and 206. The bearing portions 346, 348, 350, 352 are arranged between the support portions 338, 340, 342, 344 and the spring portions 310, 314, 326, 328. Following on from the bearing portions 346, 348, 350, 352, the restoring elements 302, 306 transition into the spring portions 310, 314, 326, 328 in a bent or angled-back manner. The spring portions 310, 314, 326, 328 extend away from the rear surfaces 122, 124 of the brake lining carrier plates 204, 206.

The restoring elements 302 and 306 have stop portions 354, 356, 358, 360. The stop portions 354, 356, 358, 360 are connected to the spring portions 310, 314, 326, 328. The stop portions 354, 356, 358, 360 extend on the front surface 216, 218 of the brake lining carrier plates 204, 206, the friction lining 208, 210 of the brake lining arrangements 200, 202 also being attached thereto. In the exemplary arrangement shown, the stop portions 354, 356, 358, 360 extend substantially parallel to the front surface 216, 218 of the brake lining carrier plates 204, 206. The stop portions 354, 356, 358, 360 have a predetermined spacing from the front surface 216, 218 of the brake lining carrier plates 204, 206. In other words, the stop portions 354, 356, 358, 360 do not bear against the front surface 216, 218 of the brake lining carrier plates 204, 206. This spacing between the front surfaces 216, 218 of the brake lining carrier plates 204, 206 and the stop portions 354, 356, 358, 360 may not be identified in FIG. 4. The stop portions 354, 356, 358, 360 extend substantially parallel to the bearing portions 346, 348, 350, 352. The lower or radially internal stop portions 358 and 360 relative to the brake disc 400 extend in recesses 220 and 222 on the front surface 216, 218 of the brake lining carrier plates 204, 206. The stop portions 358 and 360 have the same spacing from a wall surface of the respective recess 220, 222 as the upper stop portions 354, 356 from the front surface 216, 218 of the brake lining carrier plates 204, 206. This wall surface extends parallel to the front surface 214, 216 of the brake lining carrier plate 204, 206.

Figure 5:
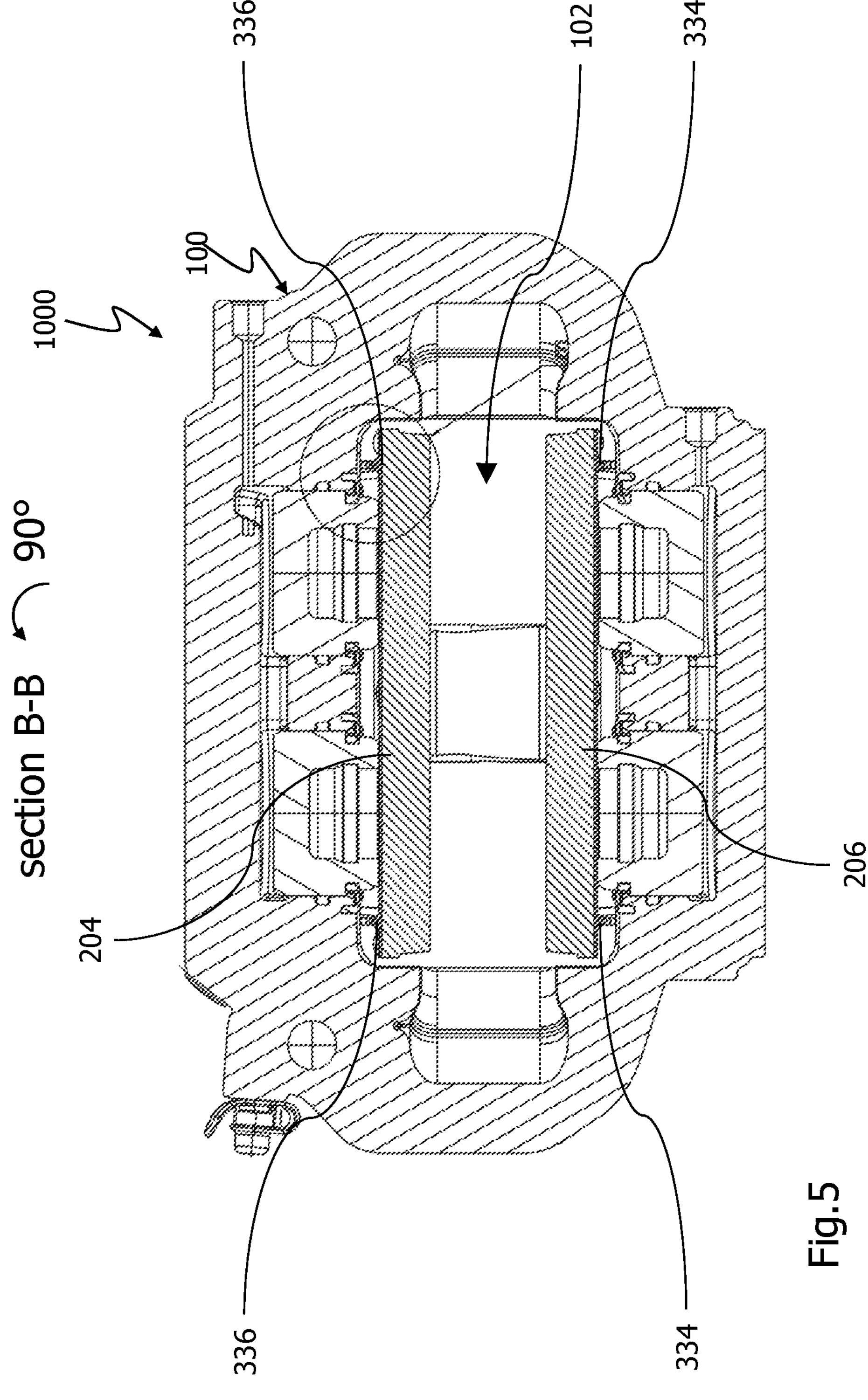
FIG. 5 shows a sectional view along the cutting line B-B in FIG. 4.

FIG. 5 shows a view of the vehicle disc brake 1000 from below. With reference to the brake disc 400 shown in FIG. 4, the radially internal surface or the lower face of the brake caliper 100 is shown in FIG. 5. The recesses 118, 120, 126 and 128 are configured on the lower face of the brake caliper 100. The spring portions 324, 326, 328, 362 are arranged in the recesses 118, 120, 126 and 128. The spring portions 324, 326, 328, 362 are of tubular configuration. The spring portions 324, 326, 328 and 362 have contact portions 330, 332, 364 and 366. The contact portions 330, 332, 364, 366 are in contact with the base B of the recesses 118, 120, 126, 128. The contact portions 330, 332, 364, 366 are configured to be bent.

Figure 6:
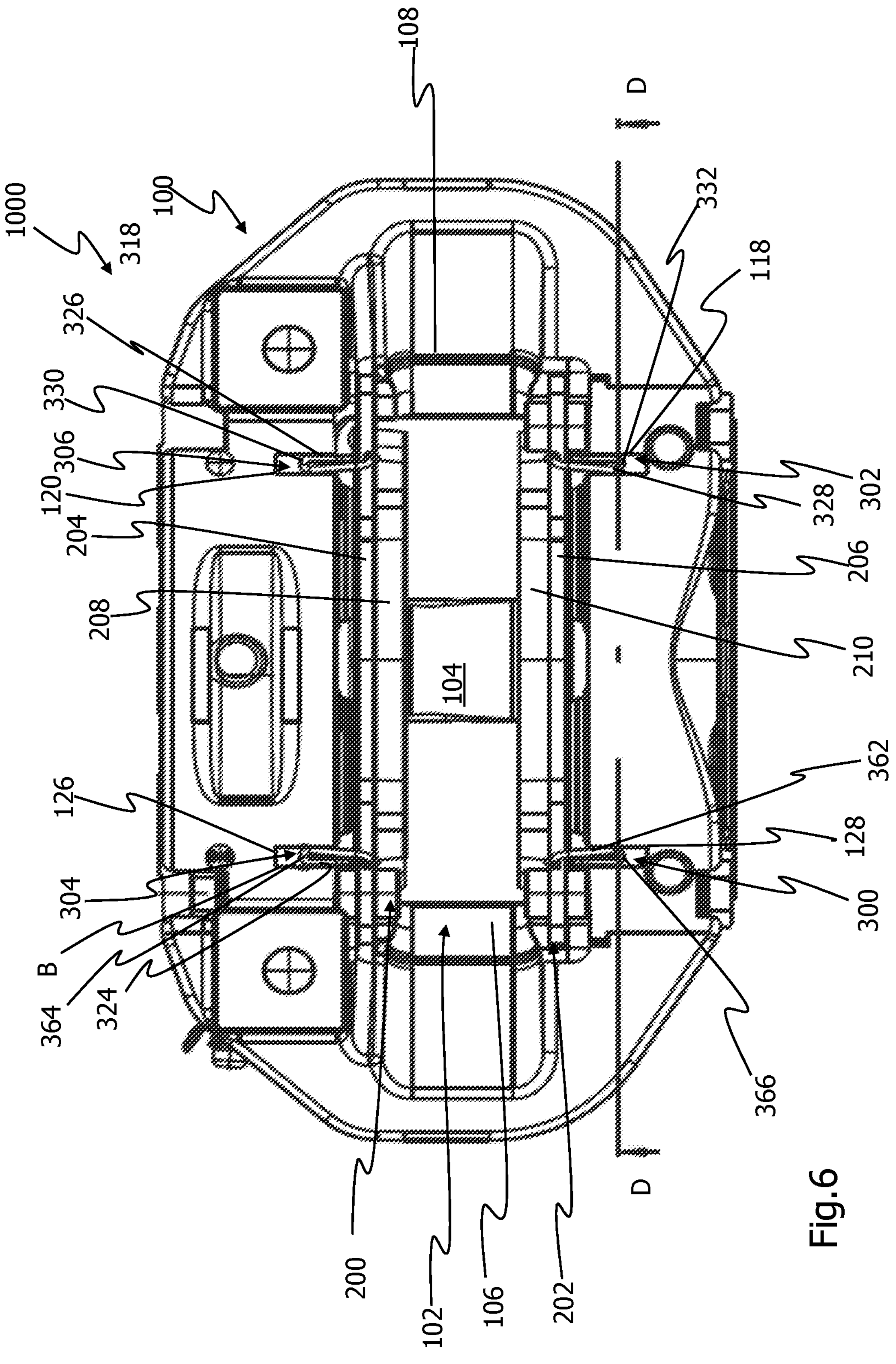
FIG. 6 shows a view of the vehicle disc brake from below.

FIG. 6 shows a perspective view of the restoring element 302. The restoring element 302 is configured as a wire spring. The restoring element 302 has two spring portions 310 and 328. The spring portions 310 and 128 are configured to be hook-shaped. The fastening portion 334 is configured between the spring portions 310 and 328 in a central region of the restoring element 302. The support portions 338 and 340 adjoin the fastening portion 334. The support portions 338 and 340 are configured to be bent. The support portions 338 and 340 are connected to the spring portions 310 and 328 via the bearing portions 346 and 352. The bearing portions 346, 352 extend in a linear manner, in the same manner as the fastening portion 334. The spring portions 310, 328 in each case have a contact portion 318, 332 which has a bend. The restoring element 302 also has two stop portions 354 and 360 which are connected to the spring portions 318, 328. The stop portions 354, 360 extend at least in some portions parallel to the bearing portions 346 and 352. The lower stop portion 360 in FIG. 6 is configured to be shortened compared with the upper stop portion 354. The free ends of the stop portions 354, 360 are bent away from the spring portions 310, 328. The spring portions 310, 328 extend in a U-shaped or V-shaped manner between one of the bearing portions 346, 352 and one of the stop portions 354, 360. The contact portion 318, 332 of the spring elements 310, 328 has the largest spacing form the stop portions 354, 360 and the bearing portions 346 and 352.

Figure 7:
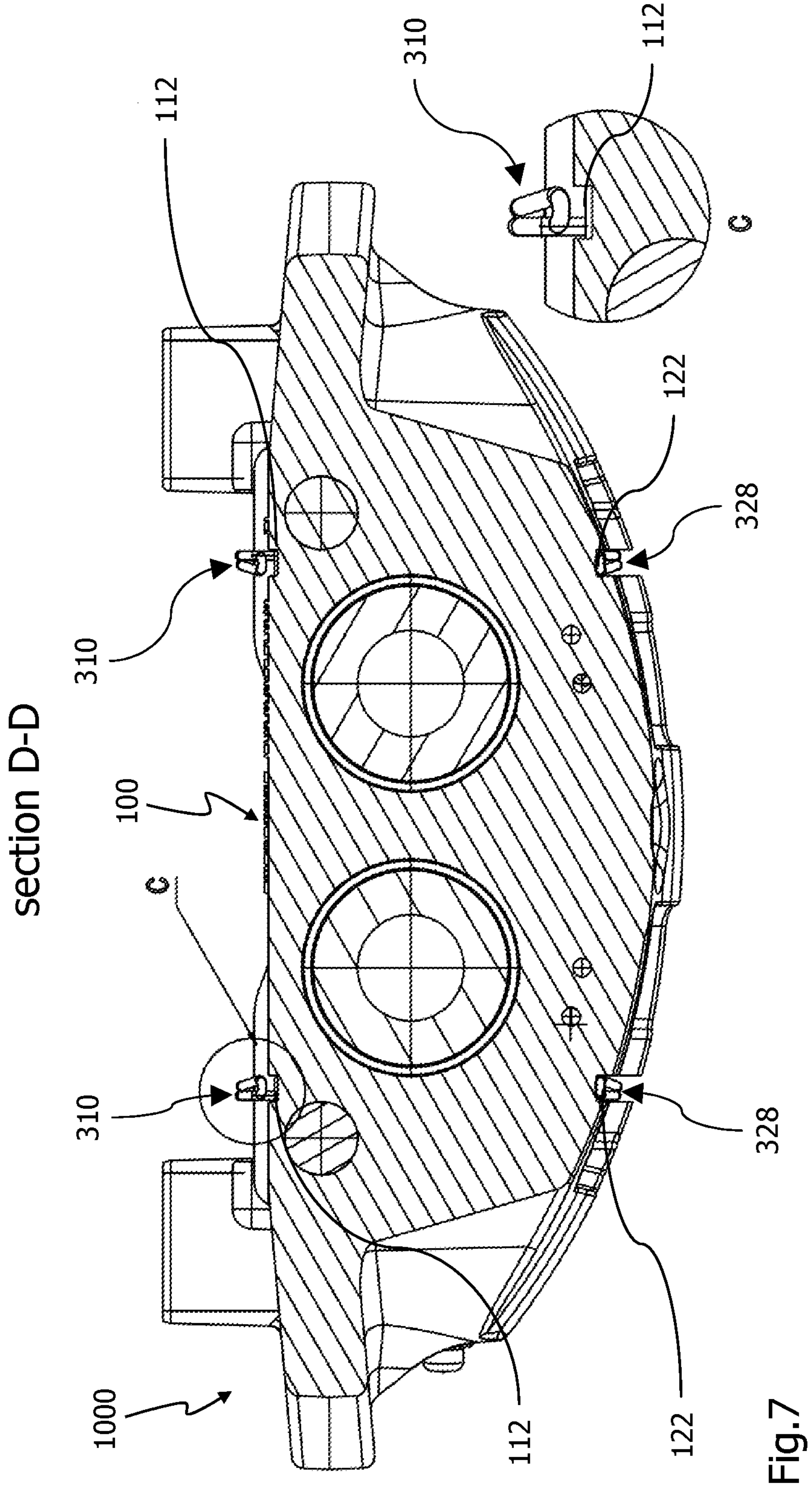
FIG. 7 shows a sectional view along the cutting line D-D in FIG. 6 with the detailed view C.
Figure 9:
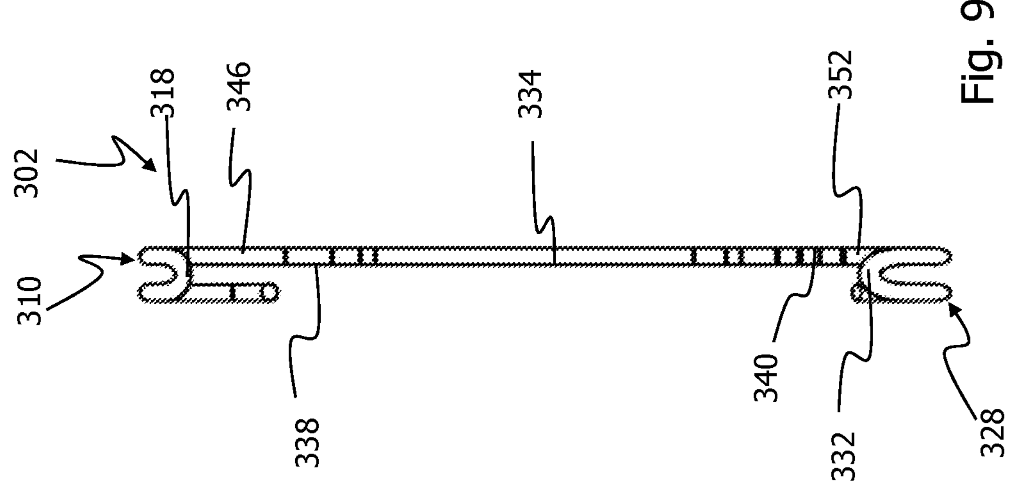
FIGS. 8 and 9 show views of a restoring element.
Figure 8:
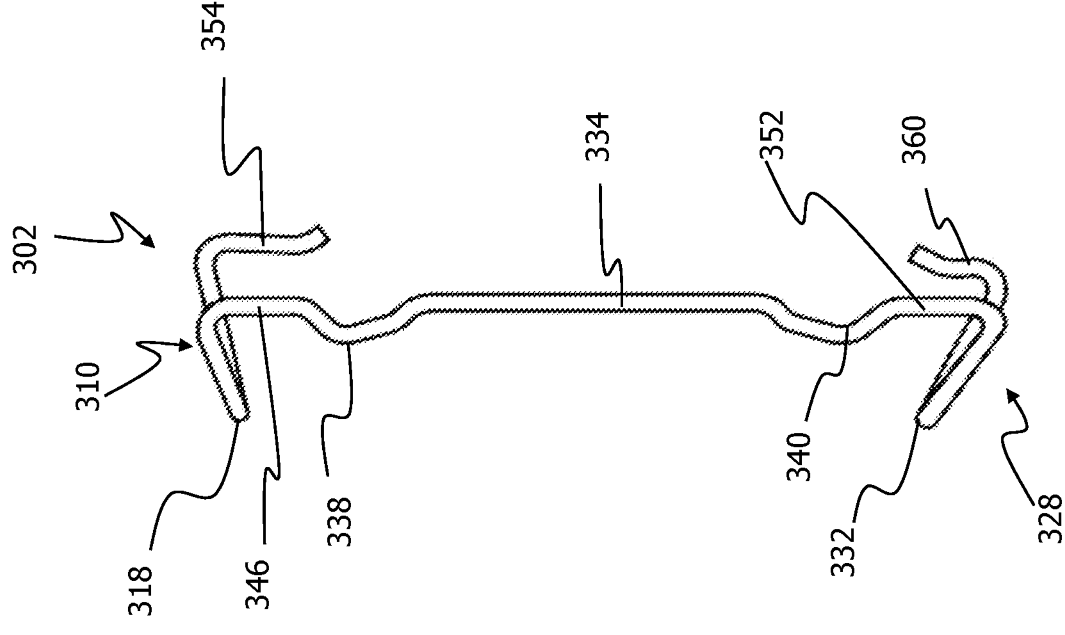

FIG. 7 shows a plan view of the restoring element 302. The spring portions 310 and 328 of U-shaped or V-shaped configuration may be identified in FIG. 7. The contact portions 318, 332 form the apex of the U-shape or V-shape.

The restoring elements 300, 302, 304 and 306 couple the brake lining arrangements 200, 202 to the brake caliper 100 and pretension the brake lining arrangements 200, 202 into a predetermined position on the brake caliper 310. The spring portions 316, 318, 320, 322, 324, 326, 328 and 362 additionally provide a restoring force, the brake lining arrangements 200, 202 being able to be restored thereby into their initial position after a braking process in order to separate the friction linings 208, 210 from the brake disc 400. A restoring force for restoring the brake lining arrangements 200, 202 into their initial position results from the pretensioning provided by the restoring elements 300, 302, 304, 306. Undesired noise developments may also be prevented by the pretensioning of the restoring elements 300, 302, 304 and 306, since vibrations occurring in the radial direction during a braking process may be damped by the restoring elements 300, 302, 304 and 306. Additionally, the wear on the friction linings 208, 210 may be compensated by the restoring elements 300, 302, 304, 306. If the wear on the friction linings exceeds a predetermined amount, whereby the actuating paths of the brake lining arrangements 200, 202 are increased, the front surface 216, 218 of the brake lining carrier plates 204, 206 comes into contact with the stop portions 354, 356, 358, 360 (see FIG. 4) and entrains the spring elements. As a result, the position of the spring elements 300, 302, 304, 306 on the brake caliper 100 is changed and displaced in the direction of the brake disc 400. In this manner, the wear on the friction linings 208, 210 may be compensated.

The invention claimed is:

1. A brake lining arrangement for a vehicle disc brake, comprising:

at least one brake lining carrier plate, at least one friction lining which is attached to the front surface of the at least one brake lining carrier plate, at least one restoring element which is fastened to a rear surface of the at least one brake lining carrier plate and which may be coupled to a brake calliper of the vehicle disc brake, wherein the at least one restoring element has at least two spring portions, wherein the at least one restoring element is configured such that the at least two spring portions of the at least one restoring element act on the brake calliper under pretensioning and wherein the at least one restoring element has at least one fastening portion and has at least one stop portion which has a predetermined spacing from the front surface of the brake lining carrier plate, wherein the at least one brake lining carrier plate has at least one recess in which the at least one stop portion extends, and wherein the at least one restoring element has at least one support portion for support on the brake calliper and/or wherein the at least one restoring element has at least one bearing portion for bearing against the rear surface of the at least one brake lining carrier plate.

2. The brake lining arrangement according to claim 1, wherein the at least one restoring element is configured to be fastened thereby to the rear surface of the at least one brake lining carrier plate, wherein the at least one fastening portion extends between the at least two spring portions.

3. The brake lining arrangement according to claim 1 wherein the at least two spring portions are configured to be hook-shaped.

4. The brake lining arrangement according to claim 1, wherein the at least two spring portions have at least one bent portion which serves for connecting to the at least one bearing portion.

5. The brake lining arrangement according to claim 1, wherein the at least one brake lining carrier plate has at least one fastening recess, the at least one fastening portion being received at least in some portions in said at least one fastening recess.

6. A brake lining arrangement for a vehicle disc brake, comprising:

at least one brake lining carrier plate, at least one friction lining which is attached to the front surface of the at least one brake lining carrier plate at least one restoring element which is fastened to a rear surface of the at least one brake lining carrier plate and which may be coupled to a brake calliper of the vehicle disc brake, wherein the at least one restoring element has at least two spring portions, wherein the at least one restoring element is configured such that the at least two spring portions of the at least one restoring element act on the brake calliper under pretensioning;

wherein the at least one restoring element has at least one fastening portion, the at least one restoring element being able to be fastened thereby to the rear surface of the at least one brake lining carrier plate, wherein the at least one fastening portion extends between the at least two spring portions; and wherein the at least one restoring element has at least one support portion for support on the brake calliper, and wherein the at least one restoring element has at least one bearing portion for bearing against the rear surface of the at least one brake lining carrier plate.

7. A vehicle disc brake comprising at least one brake lining arrangement and at least one brake calliper, the at least one brake ling arrangement being coupled thereto, wherein the brake lining arrangement further comprises:

at least one brake lining carrier plate, at least one friction lining which is attached to the front surface of the at least one brake lining carrier plate, at least one restoring element which is fastened to a rear surface of the at least one brake lining carrier plate and which may be coupled to a brake calliper of the vehicle disc brake, wherein the at least one restoring element has at least two spring portions, wherein the at least one restoring element is configured such that the at least two spring portions of the at least one restoring element act on the brake calliper under pretensioning;

wherein the at least one brake calliper has at least one recess in which at least one of the spring portions of the at least one restoring element engages.

8. The vehicle disc brake according to claim 7, wherein the at least one recess has at least one inclined base.

9. The vehicle disc brake according to claim 7, wherein the at least one brake calliper has at least one receiving channel, wherein the at least one recess is arranged, relative to a brake disc, on a radially external surface and/or on a radially internal surface of the brake calliper.

10. The vehicle disc brake according to claim 8, wherein the at least one brake calliper has at least one receiving channel, wherein the at least one recess is arranged, relative to a brake disc, on a radially external surface and/or on a radially internal surface of the brake calliper.

11. The brake lining arrangement according to claim 6, wherein the at least one restoring element has at least one stop portion which has a predetermined spacing from the front surface of the brake lining carrier plate.

12. The brake lining arrangement according to claim 11, wherein the brake lining arrangement has a brake lining carrier plate which has at least one recess in which the at least one stop portion extends.

13. The brake lining arrangement according to claim 12, wherein the at least one brake lining carrier plate has at least one fastening recess, the at least one fastening portion being received at least in some portions in said at least one fastening recess.

* * * * *